(12) United States Patent
Hu

(10) Patent No.: US 12,250,498 B2
(45) Date of Patent: *Mar. 11, 2025

(54) INTERNET OF THINGS EQUIPMENT MANAGEMENT SYSTEM AND OPERATION METHOD THEREOF

(71) Applicant: Getac Technology Corporation, New Taipei (TW)

(72) Inventor: Chien-Chih Hu, Taipei (TW)

(73) Assignee: Getac Technology Corporation, New Taipei (TW)

( * ) Notice: Subject to any disclaimer, the term of this patent is extended or adjusted under 35 U.S.C. 154(b) by 247 days.

This patent is subject to a terminal disclaimer.

(21) Appl. No.: 18/162,662

(22) Filed: Jan. 31, 2023

(65) Prior Publication Data

US 2024/0163406 A1 May 16, 2024

(30) Foreign Application Priority Data

Nov. 15, 2022 (CN) .......................... 202211425074.0

(51) Int. Cl.
*H04N 7/18* (2006.01)
*H04W 4/80* (2018.01)
*H04W 76/14* (2018.01)

(52) U.S. Cl.
CPC .............. *H04N 7/185* (2013.01); *H04W 4/80* (2018.02); *H04W 76/14* (2018.02)

(58) Field of Classification Search
CPC ......... H04N 7/185; H04W 76/14; H04W 4/80
See application file for complete search history.

(56) References Cited

U.S. PATENT DOCUMENTS

| 11,954,558 | B1* | 4/2024 | Hu ........................ G06Q 50/265 |
| 2010/0279649 | A1* | 11/2010 | Thomas ................. G06Q 10/10 |
| | | | 455/404.2 |
| 2012/0036445 | A1 | 2/2012 | Ganille |
| 2018/0114081 | A1* | 4/2018 | Dejewski ............... G06V 40/70 |

(Continued)

FOREIGN PATENT DOCUMENTS

| CN | 113688647 A | 11/2021 |
| EP | 1635556 A2 | 3/2006 |

OTHER PUBLICATIONS

Motorola, "VB400 Body-Worn Camera Brochure", Dec. 31, 2020 (Dec. 31, 2020), pp. 1-8, XP093075767, https://www.motorolasolutions.com/content/dam/msi/docs/EA_Collaterals/ENGLISH/bwc/vb400_brochure_eng.pdf?elqTrackId=737325606b9d4806a76e9301cb18e036&elqaid=6177&elqat=2&_gl=1*1cacrrg*_ga*OTEzNDQ2OTIxLjE2OTI3NzkwODA.*_ga_23THW5EV9N*MTY5Mjc3OTA4MC4xLjEuMTY5Mjc4MDE5MS42MC4wLjA.

(Continued)

*Primary Examiner* — Zaihan Jiang
(74) *Attorney, Agent, or Firm* — Li & Cai Intellectual Property Office

(57) ABSTRACT

An Internet of Things equipment management system and an operation method thereof are provided. The operation method includes: obtaining, by a wearable camera, a group number and a user name of the wearable camera from a client-side server; scanning a barcode of a sensor to obtain a serial number of the sensor and writing the group name to the sensor by the wearable camera; pairing, by the wearable camera, the group name and the serial number to establish a pairing relationship between the wearable camera and the sensor; and transmitting, by the wearable camera, the pairing relationship to the client-side server.

11 Claims, 5 Drawing Sheets

(56) References Cited

U.S. PATENT DOCUMENTS

| | | |
|---|---|---|
| 2018/0131898 A1 | 5/2018 | Guzik et al. |
| 2018/0314861 A1 | 11/2018 | Guzik |
| 2019/0236361 A1 | 8/2019 | Fish |
| 2019/0304190 A1 | 10/2019 | Johnson et al. |
| 2019/0318035 A1 | 10/2019 | Blanco et al. |
| 2020/0375457 A1 | 12/2020 | Van Tassel et al. |
| 2021/0149972 A1 | 5/2021 | Reitz et al. |
| 2021/0345118 A1 | 11/2021 | Guzik |
| 2022/0114584 A1* | 4/2022 | Conley ............... G06Q 20/3674 |
| 2022/0270176 A1* | 8/2022 | Chintakindi .......... G06F 3/0482 |
| 2023/0247716 A1* | 8/2023 | Hong ................ H04W 28/0226 |
| 2023/0274269 A1* | 8/2023 | Conley ................. G06Q 20/02 |
| | | 705/75 |

OTHER PUBLICATIONS

Search Report issued on Jan. 3, 2024 for EP application No. 23160953.8.

\* cited by examiner

INTERNET OF THINGS EQUIPMENT MANAGEMENT SYSTEM AND OPERATION METHOD THEREOF

CROSS-REFERENCE TO RELATED PATENT APPLICATION

This application claims the benefit of priority to China Patent Application No. 202211425074.0, filed on Nov. 15, 2022 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an Internet of Things system and an operation method thereof, and more particularly to an Internet of Things equipment management system and an operation method thereof.

BACKGROUND OF THE DISCLOSURE

Police duties are often accompanied by potential danger, and it is necessary to document data corresponding to weapons and protective equipment on a server, so that the status of the weapons and protective equipment equipped by each policeman can be effectively managed.

For example, according to different requirements for a mission, policemen are divided into different squads to perform a variety of tasks, and the weapons assigned to each squad may correspond to an exclusive group name in the database. For example, if 50 out of a total of 100 weapons are assigned to the policemen of a first squad during documentation of the weapons, a first group name can be designated to each of the weapons of the first squad. The remaining 50 weapons may be assigned to the policemen of a second squad, and during documentation of these weapons, a second group name can be designated for each of the weapons of the second squad.

Due to allocation of duties, the number of squads and the weapons assigned thereto may vary. Thus, service contractors for gear documentation may need to re-designate a new group name for each weapon, which can quickly become a time-consuming burden.

SUMMARY OF THE DISCLOSURE

In response to the above-referenced technical inadequacy, the present disclosure provides an Internet of Things equipment management system and an operation method thereof.

In one aspect, the present disclosure provides an Internet of Things equipment management system, which includes a client-side server, a wearable camera, and a sensor. The wearable camera is connected to the client-side server through a network and obtains a group name and a user name of the wearable camera from the client-side server. The wearable camera is configured to: scan a barcode of the sensor to obtain a serial number from the sensor and write the group name to the sensor; pair the group name and the serial number to establish a pairing relationship between the wearable camera and the sensor; and transmit the pairing relationship to the client-side server, for establishing, by the client-side server, a mapping table according to the pairing relationship. The mapping table includes the user name, the group name, and the serial number.

In another aspect, the present disclosure provides an Internet of Things equipment management system for a sensor having a barcode. The Internet of Things equipment management system includes a client-side server and a wearable camera. The wearable camera is connected to the client-side server through a network and obtains a group name and a user name of the wearable camera from the client-side server. The wearable camera is configured to: scan the barcode to obtain a serial number from the sensor and write the group name to the sensor; pair the group name and the serial number to establish a pairing relationship between the wearable camera and the sensor; and transmit the pairing relationship to the client-side server, for establishing, by the client-side server, a mapping table according to the pairing relationship. The mapping table includes the user name, the group name, and the serial number.

In yet another aspect, the present disclosure provides an operation method of an Internet of Things equipment management system, which includes: obtaining, by a wearable camera, a group name and a user name of a wearable camera from a client-side server; scanning a barcode of a sensor, by the wearable camera, to obtain a serial number of the sensor and writing the group name to the sensor; pairing, by the wearable camera, the group name and the serial number to establish a pairing relationship between the wearable camera and the sensor; transmitting, by the wearable camera, the pairing relationship to the client-side server; and establishing, by the client-side server, a mapping table according to the pairing relationship. The mapping table includes the user name, the group name, and the serial number.

Therefore, in the Internet of Things equipment management system and the operation method thereof provided by the present disclosure, users can pair the wearable camera with the sensor and document relevant data in the client-side server for data management of the wearable camera and the sensor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
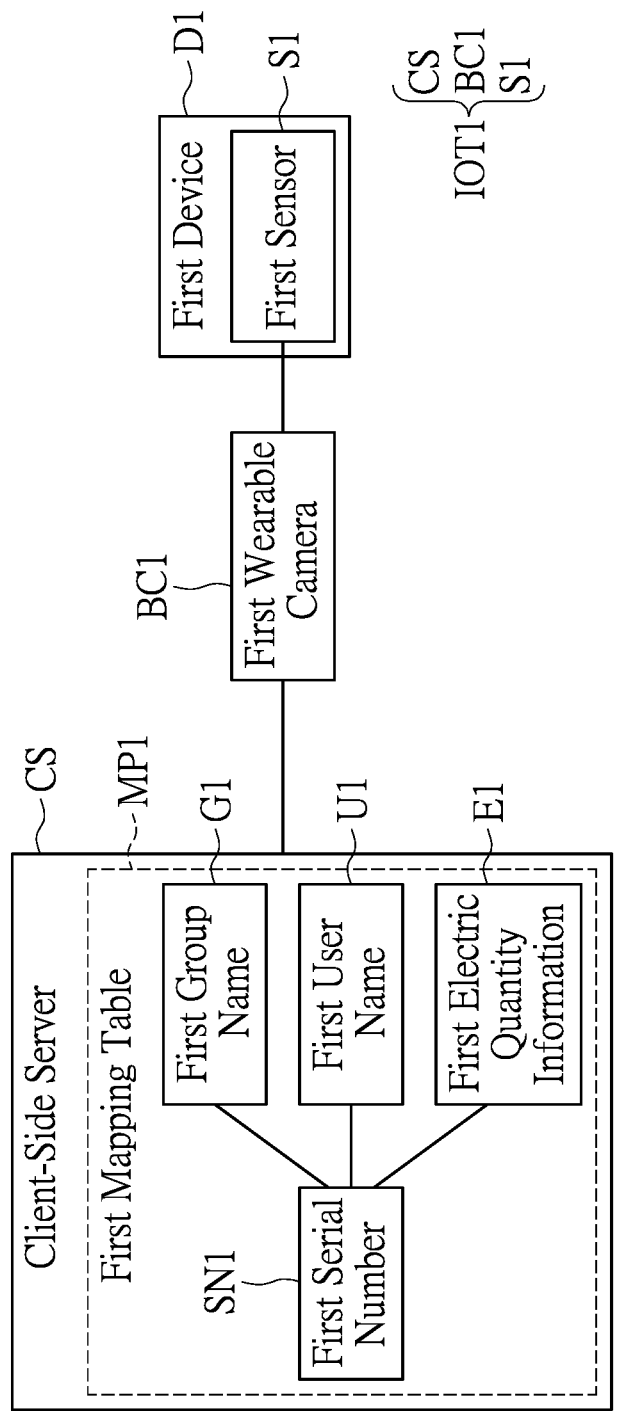
FIG. 1 is a functional block diagram of an Internet of Things equipment management system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

FIG. 1 is a functional block diagram of an Internet of Things equipment management system according to a first embodiment of the present disclosure. As shown in FIG. 1, an Internet of Things equipment management system IOT1 includes, for example, a client-side server CS, a first wearable camera BC1, and a first sensor S1. The first wearable camera BC1 is worn on the body of a first user. The first sensor S1 is disposed on a first device D1 used by the first user. The first device D1 can be, for example, a police weapon or a protective device, but is not limited thereto.

Figure 2:
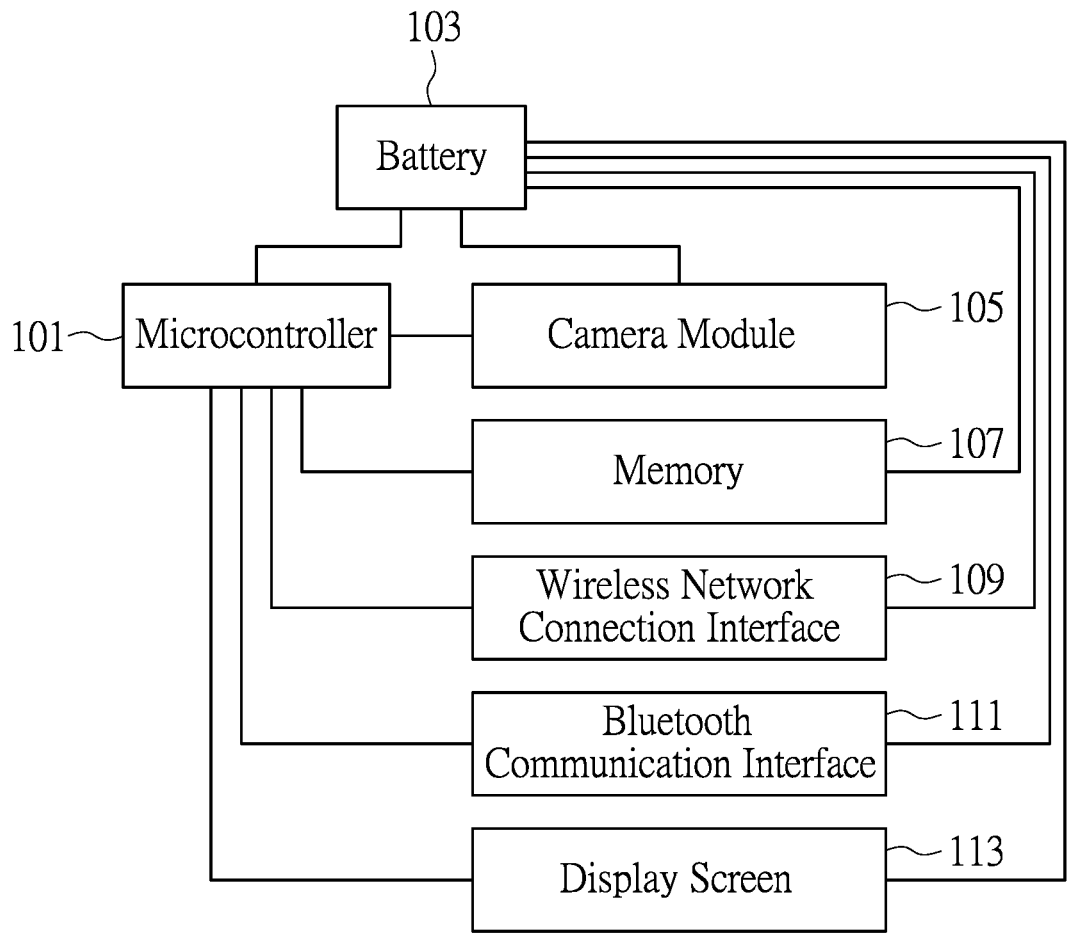
FIG. 2 is a functional block diagram of a first wearable camera of FIG. 1.

FIG. 2 is a functional block diagram of a first wearable camera of FIG. 1. As shown in FIG. 2, the first wearable camera BC1 includes, for example, a microcontroller 101, a battery 103, a camera module 105, a memory 107, a wireless network connection interface 109, a BLUETOOTH® communication interface 111, and a display screen 113. The battery 103 is electrically connected to the microcontroller 101, the camera module 105, the memory 107, the wireless network connection interface 109, the BLUETOOTH® communication interface 111, and the display screen 113, so as to supply the power required for operation of the microcontroller 101, the camera module 105, the memory 107, the wireless network connection interface 109, the BLUETOOTH® communication interface 111, and the display screen 113. Images or videos obtained by the camera module 105 are transmitted to the memory 107 for storage. The camera module 105, the memory 107, the wireless network connection interface 109, the BLUETOOTH® communication interface 111, and the display screen 113 are electrically connected to the microcontroller 101.

Figure 3:
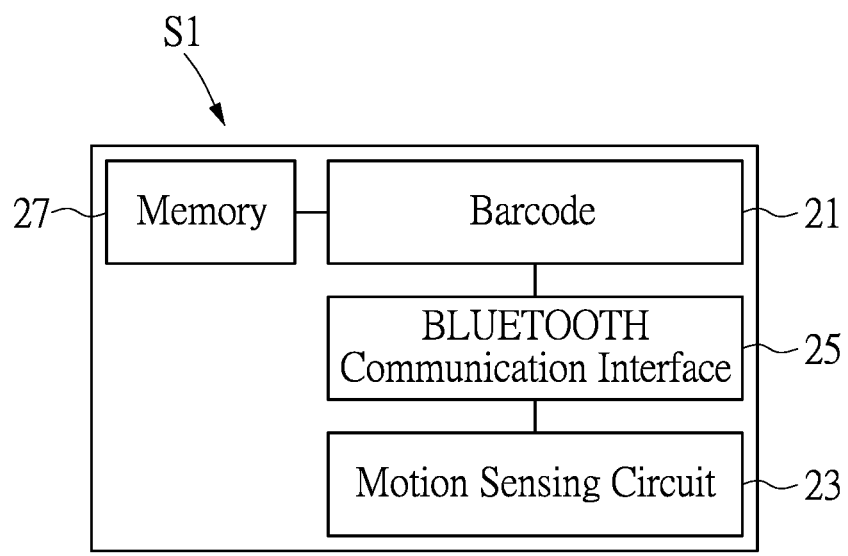
FIG. 3 is a functional block diagram of a first sensor of FIG. 1.

FIG. 3 is a functional block diagram of a first sensor of FIG. 1. The first sensor S1 may include, for example, a barcode 21, a motion sensing circuit 23, a BLUETOOTH® communication interface 25, and a memory 27. The barcode 21 can be, for example, a 2D barcode or a 3D barcode, but is not limited thereto. The BLUETOOTH® communication interface 25 is electrically connected to the motion sensing circuit 23 and the barcode 21, and the memory 27 is electrically connected to the barcode 21. When the first device D1 is subject to an external force and generates a motion, the first sensor S1 is triggered. The triggering of the first sensor S1 indicates that the motion sensing circuit 23 of the first sensor S1 detects the motion of the first device D1 and transmits a control signal to activate the BLUETOOTH® communication interface 25. When being activated, the BLUETOOTH® communication interface 25 broadcasts data packets.

The first wearable camera BC1 is network-connected to the client-side server CS, so as to receive data packets from the client-side server CS and transmit data packets to the client-side server CS. When the first wearable camera BC1 is turned on, the first wearable camera BC1 is network-connected to the client-side server CS. The first wearable camera BC1 obtains a first group name G1 and a first user name U1 of the first wearable camera BC1 from the client-side server CS, and stores the first group name G1 and the first user name U1 in the memory 107 of the first wearable camera BC1.

The first wearable camera BC1 scans the barcode 21 of the first sensor S1. When the first wearable camera BC1 scans the barcode 21 of the first sensor S1, the first wearable camera BC1 obtains a first serial number SN1 of the first sensor S1 from the first sensor S1, and writes the first group name G1 of the first wearable camera BC1 to the memory 27 of the first sensor S1.

After the first wearable camera BC1 obtains the first serial number SN1 and writes the first group name G1 to the memory 27 of the first sensor S1, the first wearable camera BC1 pairs the first serial number SN1 of the first sensor S1 and the first group name G1 of the first wearable camera BC1 to establish a pairing relationship between the first sensor S1 and the first wearable camera BC1.

After the first wearable camera BC1 establishes the pairing relationship between the first sensor S1 and the first wearable camera BC1, the first wearable camera BC1 transmits the pairing relationship between the first sensor S1 and the first wearable camera BC1 to the client-side server CS through a network.

When the client-side server CS receives the pairing relationship between the first sensor S1 and the first wearable camera BC1, the client-side server CS establishes a first mapping table MP1 according to the pairing relationship between the first sensor S1 and the first wearable camera BC1. The first mapping table MP1 includes the first serial number SN1, the first user name U1, and the first group name G1.

Moreover, after the client-side server CS establishes the first mapping table MP1, the first sensor S1 broadcasts one data packet to the first wearable camera BC1 by a predetermined period. The data packet includes first electric quantity information E1 of the first sensor S1. When the first wearable camera BC1 receives the first electric quantity information E1 broadcast by the first sensor S1, the first wearable camera BC1 transmits the first electric quantity information E1 to the client-side server CS through the network. When the client-side server CS receives the first electric quantity information E1, the client-side server CS writes the first electric quantity information E1 to the previously created first mapping table MP1.

In addition, when the first device D1 is subject to an external force and generates a motion, the first sensor S1 of the first device D1 is triggered. When the first sensor S1 is triggered, the BLUETOOTH® communication interface 25 of the first sensor S1 broadcasts one data packet that includes the first group name G1, the first serial number SN1, and the first electric quantity information E1 of the first sensor S1. When the first wearable camera BC1 receives the data packet broadcast by the first sensor S1, a shooting function of the first wearable camera BC1 is activated.

Second Embodiment

Figure 4:
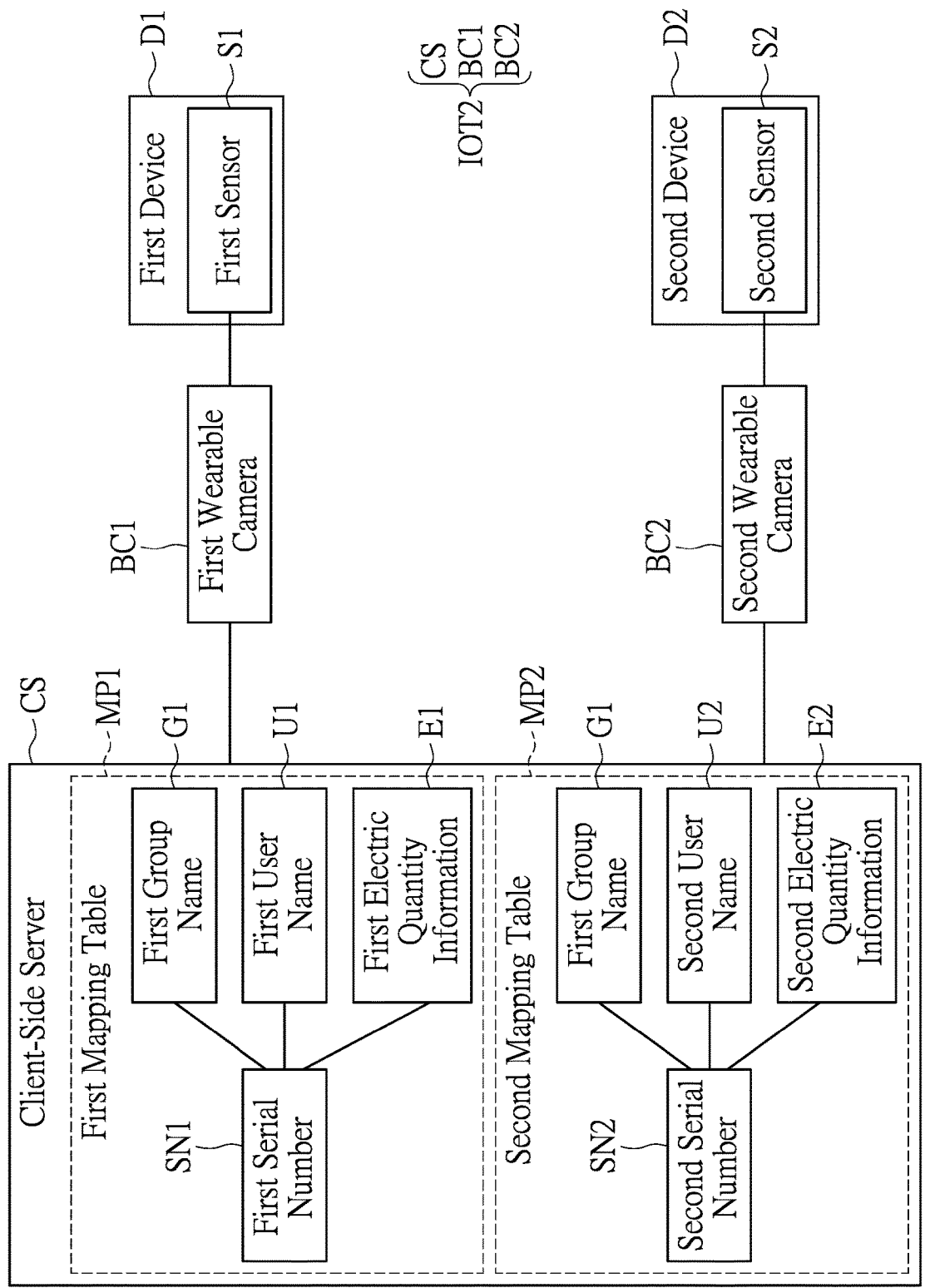
FIG. 4 is a functional block diagram of the Internet of Things equipment management system according to a second embodiment of the present disclosure.

FIG. 4 is a functional block diagram of the Internet of Things equipment management system according to a second embodiment of the present disclosure. Differences between an Internet of Things equipment management system IOT2 and the Internet of Things equipment management system IOT1 are illustrated below.

As shown in FIG. 4, the Internet of Things equipment management system IOT2 is applicable to a first sensor S1 used by a first user and a second sensor S2 used by a second user. A hardware architecture of the second sensor S2 is identical to that of the first sensor S1.

The Internet of Things equipment management system IOT2 includes a client-side server CS, a first wearable camera BC1, and a second wearable camera BC2. The second wearable camera BC2 is worn on the body of the second user, and a hardware architecture of the second wearable camera BC2 is identical to that of the first wearable camera BC1. The second sensor S2 is disposed on a second device D2 used by the second user. The second device D2 can be, for example, a police weapon or a protective device, but is not limited thereto.

When being turned on, the second wearable camera BC2 is network-connected to the client-side server CS. The second wearable camera BC2 obtains a first group name G1 and a second user name U2 of the second wearable camera BC2 from the client-side server CS, and stores the first group name G1 and the second user name U2 in the memory 107 of the second wearable camera BC2.

The second wearable camera BC2 scans a barcode 21 of the second sensor S2. When the second wearable camera BC2 scans the barcode 21 of the second sensor S2, the second wearable camera BC2 obtains a second serial number SN2 of the second sensor S2 from the second sensor S2, and writes the first group name G1 of the second wearable camera BC2 to a memory 27 of the second sensor S2.

After the second wearable camera BC2 obtains the second serial number SN2 and writes the first group name G1 to the memory 27 of the second sensor S2, the second wearable camera BC2 pairs the second serial number SN2 of the second sensor S2 with the first group name G1 of the second wearable camera BC2, so as to establish a pairing relationship between the second sensor S2 and the second wearable camera BC2.

After the second wearable camera BC2 establishes the pairing relationship between the second sensor S2 and the second wearable camera BC2, the second wearable camera BC2 transmits the pairing relationship between the second sensor S2 and the second wearable camera BC2 to the client-side server CS through a network.

When the client-side server CS receives the pairing relationship between the second sensor S2 and the second wearable camera BC2, the client-side server CS establishes a second mapping table MP2 according to the pairing relationship between the second sensor S2 and the second wearable camera BC2. The second mapping table MP2 includes the second serial number SN2, the second user name U2, and the first group name G1.

Moreover, after the client-side server CS establishes the second mapping table MP2, the second sensor S2 broadcasts one data packet to the second wearable camera BC2 by a predetermined period. The data packet includes second electric quantity information E2 of the second sensor S2. When the second wearable camera BC2 receives the second electric quantity information E2 broadcast by the second sensor S2, the second wearable camera BC2 transmits the second electric quantity information E2 to the client-side server CS through the network. When the client-side server CS receives the second electric quantity information E2, the client-side server CS writes the second electric quantity information E2 to the previously created second mapping table MP2.

In addition, when a first device D1 generates a motion due to an external force, the first sensor S1 on the first device D1 is triggered. When the first sensor S1 is triggered, a BLUETOOTH® communication interface 25 of the first sensor S1 broadcasts one data packet that includes the first group name G1, a first serial number SN1, and first electric quantity information E1 of the first sensor S1. When both the first wearable camera BC1 and the second wearable camera BC2 receive the data packet broadcast by the first sensor S1, since the first wearable camera BC1 and the second wearable camera BC2 belong to the first group name G1, a shooting function of the first wearable camera BC1 and a shooting function of the second wearable camera BC2 can both be activated.

In the Internet of Things equipment management system IOT2 shown in FIG. 4, the first sensor S1, the second sensor S2, the first wearable camera BC1, and the second wearable camera BC2 all belong to the first group name G1. However, in other embodiments, the first sensor S1 and the first wearable camera BC1 may belong to the first group name G1, while the second sensor S2 and the second wearable camera BC2 belong to the second group name.

Figure 5:
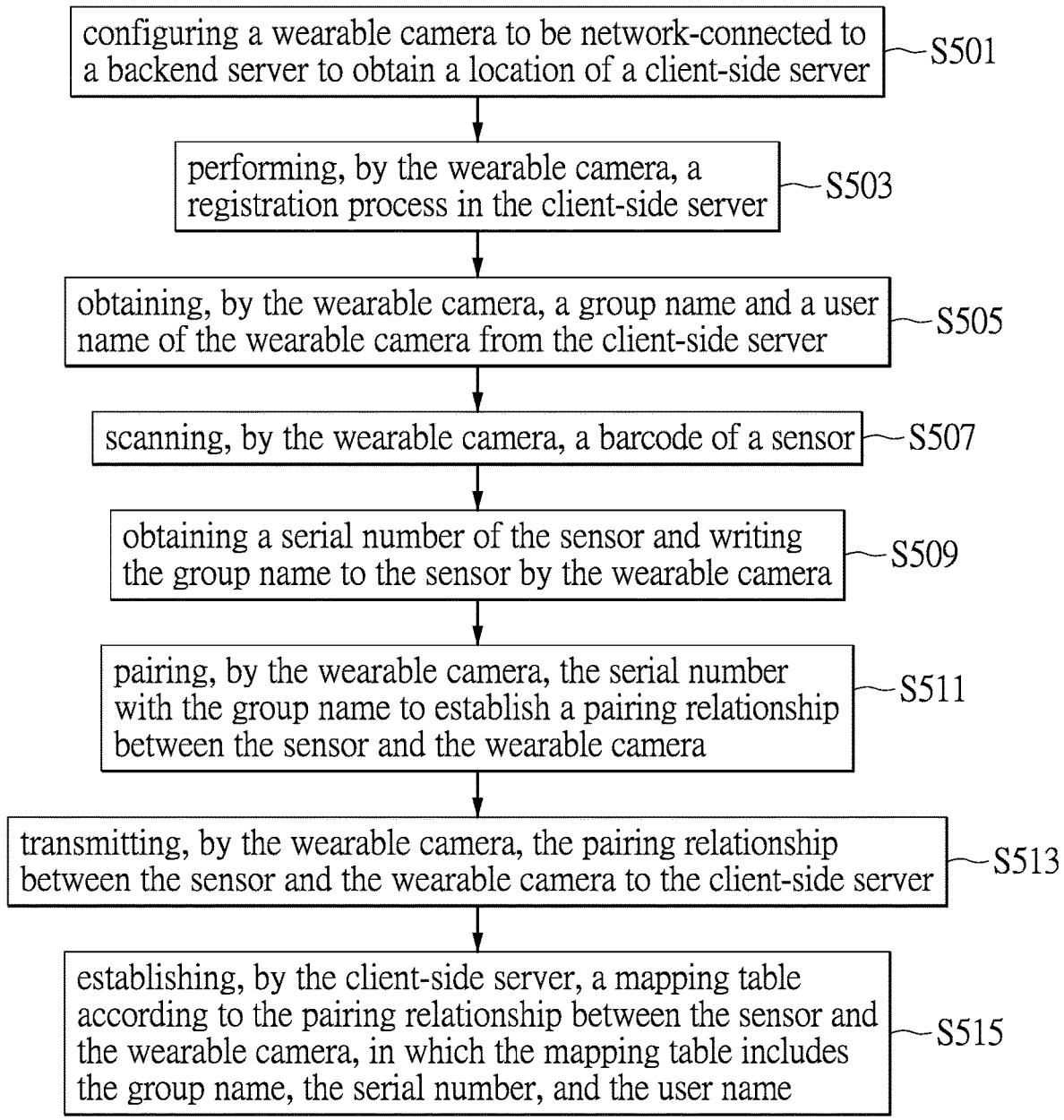
FIG. 5 is a flow chart of an operation method of the Internet of Things equipment management system according to one embodiment of the present disclosure.

FIG. 5 is a flow chart of an operation method of the Internet of Things equipment management system according to one embodiment of the present disclosure. The operation method of the Internet of Things equipment management system in FIG. 5 can be implemented, for example, in the Internet of Things equipment management system IOT1 of FIG. 1 or in the Internet of Things equipment management system IOT2 of FIG. 4, but is not limited thereto.

As shown in FIG. 5, in step S501, a wearable camera is network-connected to a backend server to obtain a location of a client-side server. In step S503, the wearable camera performs a registration process in the client-side server. In step S505, the wearable camera obtains a group name and a user name of the wearable camera from the client-side server. In step S507, the wearable camera scans a barcode of the sensor. In step S509, the wearable camera obtains a serial number of the sensor and writes the group name to the sensor. In step S511, the wearable camera pairs the serial number with the group name to establish a pairing relationship between the sensor and the wearable camera. In step S513, the wearable camera transmits the pairing relationship between the sensor and the wearable camera to the client-side server. In step S515, the client-side server establishes a mapping table according to the pairing relationship between the sensor and the wearable camera, in which the mapping table includes the group name, the serial number, and the user name.

Figure 6:
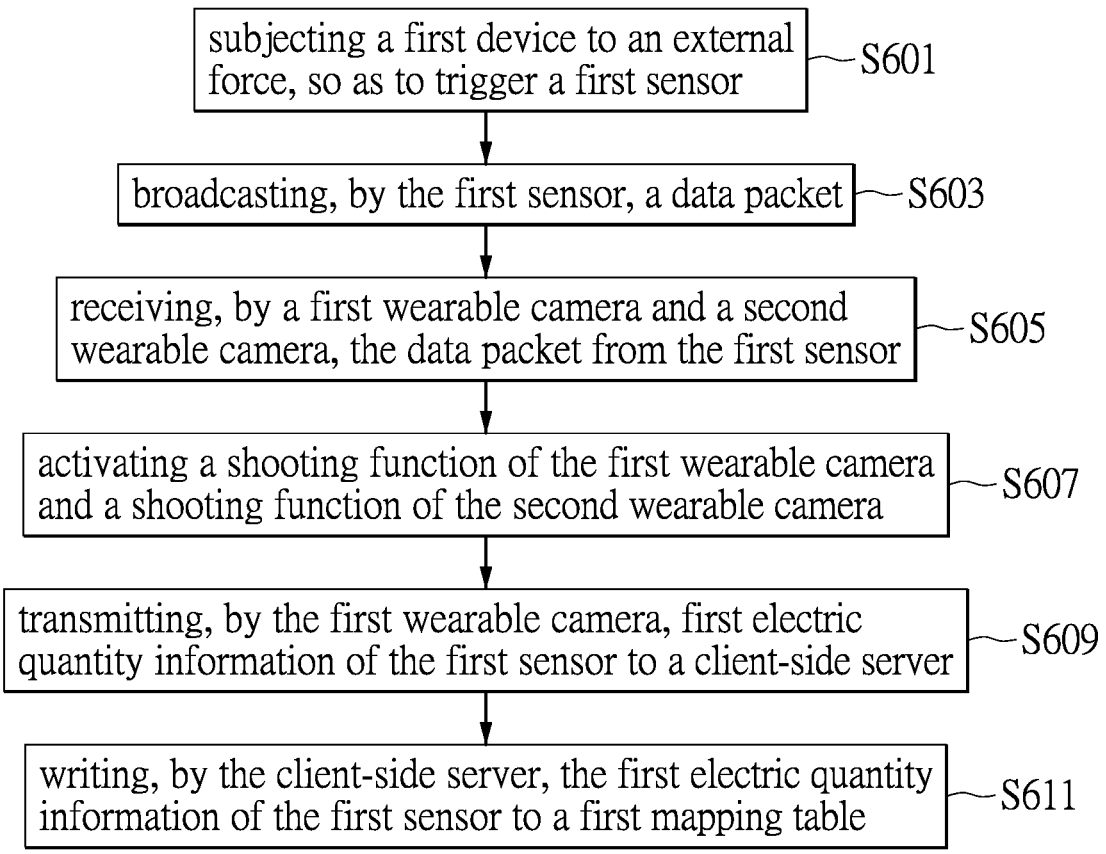
FIG. 6 is an operation flow chart of the Internet of Things equipment management system of the present disclosure when the first sensor is triggered.

FIG. 6 is an operation flow chart of the Internet of Things equipment management system of the present disclosure when the first sensor is triggered. As shown in FIG. 6, in step S601, a first device D1 is subject to an external force, so that a first sensor S1 is triggered. In step S603, the first sensor S1 broadcasts one data packet that includes a first group name G1, a first serial number SN1, and first electric quantity information E1 of the first sensor S1. In step S605, a first wearable camera BC1 and a second wearable camera BC2 both receive the data packet from the first sensor S1. In step S607, a shooting function of the first wearable camera BC1 and a shooting function of the second wearable camera BC2 are both activated. In step S609, the first wearable camera BC1 transmits the first electric quantity information E1 of the first sensor S1 to a client-side server CS. In step S611, the client-side server CS writes the first electric quantity information E1 of the first sensor S1 to a first mapping table MP1.

BENEFICIAL EFFECTS OF THE EMBODIMENTS

In conclusion, in the Internet of Things equipment management system and the operation method thereof provided by the present disclosure, users can pair the wearable camera with the sensor and document relevant data in the client-side server for data management of the wearable camera and the sensor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An Internet of Things equipment management system, comprising:
   a client-side server;
   a first wearable camera network-connected to the client-side server and obtaining a group name and a user name of the first wearable camera from the client-side server; and
   a sensor having a barcode;
   wherein the first wearable camera is configured to:
      scan the barcode to obtain a serial number from the sensor and write the group name to the sensor;
      pair the group name and the serial number to establish a pairing relationship between the first wearable camera and the sensor; and
      transmit the pairing relationship to the client-side server for establishing, by the client-side server, a mapping table according to the pairing relationship;
   wherein the mapping table includes the user name, the group name, and the serial number.

2. The Internet of Things equipment management system according to claim 1, wherein, when the sensor is triggered, the sensor sends a data packet, and the data packet includes the serial number, the group name, and electric quantity information of the sensor;
   wherein, after the data packet is read by the first wearable camera, a shooting function of the first wearable camera is activated.

3. The Internet of Things equipment management system according to claim 2, wherein the sensor includes a motion sensing circuit and a BLUETOOTH® communication interface electrically connected to the motion sensing circuit;
   wherein, when the motion sensing circuit detects a motion, the BLUETOOTH® communication interface broadcasts the data packet.

4. The Internet of Things equipment management system according to claim 1, further comprising a second wearable camera, a group name of the second wearable camera being identical to the group name of the first wearable camera;
   wherein, when the sensor is triggered, the sensor broadcasts a data packet, and the data packet includes the serial number, the group name, and electric quantity information of the sensor; wherein, after the data packet is read by the first wearable camera and the second wearable camera, a shooting function of the first wearable camera and a shooting function of the second wearable camera are activated.

5. An Internet of Things equipment management system for a sensor having a barcode, the Internet of Things equipment management system comprising:
   a client-side server; and
   a first wearable camera network-connected to the client-side server and obtaining a group name and a user name of the first wearable camera from the client-side server;
   wherein the first wearable camera is configured to:
      obtain the group name;
      scan the barcode to obtain a serial number from the sensor and write the group name to the sensor;
      pair the group name and the serial number to establish a pairing relationship between the first wearable camera and the sensor; and
      transmit the pairing relationship to the client-side server for establishing, by the client-side server, a mapping table according to the pairing relationship;
   wherein the mapping table includes the user name, the group name, and the serial number.

6. The Internet of Things equipment management system according to claim 5, wherein, when the sensor is triggered, the sensor broadcasts a data packet, and the data packet includes the serial number, the group name, and electric quantity information of the sensor;
   wherein, after the data packet is read by the first wearable camera, a shooting function of the first wearable camera is activated.

7. The Internet of Things equipment management system according to claim 6, wherein the sensor includes a motion sensing circuit and a BLUETOOTH® communication interface electrically connected to the motion sensing circuit;
   wherein, when the motion sensing circuit detects a motion, the BLUETOOTH® communication interface broadcasts the data packet.

8. The Internet of Things equipment management system according to claim 6, further comprising a second wearable camera, a group name of the second wearable camera being identical to the group name of the first wearable camera; wherein, when the sensor is triggered, the sensor broadcasts a data packet, and the data packet includes the serial number, the group name, and electric quantity information of the sensor;

wherein, after the data packet is read by the first wearable camera and the second wearable camera, a shooting function of the first wearable camera and a shooting function of the second wearable camera are activated.

9. An operation method of an Internet of Things equipment management system, comprising:

obtaining, by a wearable camera, a group name and a user name of the wearable camera from a client-side server;

scanning a barcode of a sensor to obtain a serial number of the sensor and writing the group name to the sensor by the wearable camera;

pairing, by the wearable camera, the group name and the serial number to establish a pairing relationship between the wearable camera and the sensor;

transmitting, by the wearable camera, the pairing relationship to the client-side server; and establishing, by the client-side server, a mapping table according to the pairing relationship, wherein the mapping table includes the user name, the group name, and the serial number.

10. The operation method according to claim 9, further comprising:

configuring the wearable camera to be network-connected to a backend server to obtain a location of the client-side server before the group name and the user name are obtained from the client-side server; and performing, by the wearable camera, a registration process in the client-side server after the location of the client-side server is obtained.

11. The operation method according to claim 9, further comprising:

broadcasting, by the sensor, a data packet to the wearable camera when the sensor is triggered, wherein the data packet includes the group name, the serial number, and electric quantity information of the sensor;

wherein, after the data packet is read by the wearable camera, a shooting function of the wearable camera is activated.

* * * * *